United States Patent
Henig et al.

(10) Patent No.: US 7,290,257 B2
(45) Date of Patent: Oct. 30, 2007

(54) INSTALLING SOFTWARE APPLICATIONS AND ASSOCIATED DATA ON MOBILE COMPUTERS

(75) Inventors: Gerhard Henig, Heidelberg (DE); Prasad Kompalli, Bangalore (IN)

(73) Assignee: SAP AG, Waldorf (DE)

(*) Notice: Subject to any disclaimer, the term of this patent is extended or adjusted under 35 U.S.C. 154(b) by 360 days.

(21) Appl. No.: 10/232,949

(22) Filed: Aug. 30, 2002

(65) Prior Publication Data
US 2004/0044694 A1    Mar. 4, 2004

(51) Int. Cl.
*G06F 9/445*    (2006.01)
(52) U.S. Cl. .............. 717/176; 717/169; 717/171; 717/172; 717/175; 717/177
(58) Field of Classification Search ........ 717/168–178; 707/104.1, 200, 201, 203, 204; 705/1, 7, 705/22, 26–29
See application file for complete search history.

(56) References Cited

U.S. PATENT DOCUMENTS

| | | | |
|---|---|---|---|
| 5,602,993 A | 2/1997 | Strömberg | |
| 5,742,829 A * | 4/1998 | Davis et al. | 717/178 |
| 5,752,042 A * | 5/1998 | Cole et al. | 717/173 |
| 5,845,090 A | 12/1998 | Collins, III et al. | |
| 5,960,204 A * | 9/1999 | Yinger et al. | 717/176 |
| 6,151,643 A * | 11/2000 | Cheng et al. | 710/36 |
| 6,269,456 B1 | 7/2001 | Hodges et al. | |
| 6,347,398 B1 * | 2/2002 | Parthasarathy et al. | 717/178 |
| 6,493,871 B1 * | 12/2002 | McGuire et al. | 717/173 |
| 6,883,168 B1 * | 4/2005 | James et al. | 717/178 |
| 2002/0188941 A1 * | 12/2002 | Cicciarelli et al. | 717/175 |
| 2002/0188942 A1 * | 12/2002 | Bryan et al. | 717/176 |

* cited by examiner

*Primary Examiner*—William H. Wood
(74) *Attorney, Agent, or Firm*—Fish & Richardson P.C.

(57) ABSTRACT

Techniques are disclosed to install a software application and its associated data onto mobile computers. The associated data include data common to all mobile computers, as well as defined site-specific data applicable to a specific mobile computer. As is typical, the associated data are stored in a database on a central server, and are constantly being changed and updated there. The installation process involves the use of a separate installation computer, which may be unattended. The common data are copied from the central server database to the installation computer. For each mobile computer receiving an install, the common data are copied to the mobile computer from the installation computer, and the site-specific data are copied to the mobile computer from the central server database. The software application may also be installed on the mobile computer as part of the installation process.

45 Claims, 3 Drawing Sheets

INSTALLING SOFTWARE APPLICATIONS AND ASSOCIATED DATA ON MOBILE COMPUTERS

TECHNICAL FIELD

This disclosure relates to downloading data onto a computer.

BACKGROUND

Typically whenever a user wants to integrate new computers into a network or upgrade existing computers with newer software, a manual process is required to add or update software on these computers. Generally, this is done by connecting a computer to a network, and following a series of manual actions, downloading the software from a server. The manual actions include designating the locations where the data are to be downloaded, designating what types of data are required for each computer, installing applications, etc. Each subsequent computer that requires new software or upgraded software follows the same process until all the computers have the necessary software.

The process is further complicated when the network also services mobile computers. Mobile computers, for example, are laptop computers that dial-in for access to the network or login through a local area network. The mobile computers are used, for example, by sales people who travel on the road from customer to customer. Each sales person typically carries on their mobile computer specific data that are relevant for their geographic sales area, for example. It is often a cumbersome and time consuming process to have all of the mobile computers for an entire organization physically together to update the software on each and every mobile computer. It is desirable to look for faster and more efficient methods for installing data onto computers.

SUMMARY

The invention provides a more efficient way to install a software application and its associated data onto mobile computers. The associated data includes data common to all mobile computers, as well as defined site-specific data applicable to a specific mobile computer. As is typical, the associated data are stored in a database on a central server, and are constantly being changed and updated there. The installation process involves the use of a separate installation computer. The common data are copied from the central server database to the installation computer. For each mobile computer receiving an install, the common data are copied to the mobile computer from the installation computer, and the site-specific data are copied to the mobile computer from the central server database.

In one aspect, the invention provides a method of installing a software application and associated data on mobile computers. The method includes copying, from a database of a server to a site, data that are to be used in common by mobile computers. The method also includes copying the data to each of the mobile computers through a network. The method further includes copying additional data to each of the mobile computers. The additional data are different for at least two of the mobile computers.

Various embodiments of the method may include one or more of the following features. The method may also include installing automatically an application onto the mobile computer. The method may also include storing a parameter file that includes user selectable parameters associated with installation of an application on the site computer, copying the parameter file onto the mobile computers, and using the parameter file to automatically interact with an installation application on the mobile computer to install the application onto the mobile computer. The method may further include checking and canceling pending requests for information in the server. The method may also include clearing an outbound queue of the server. The method may further include updating the site periodically with the common data from the server. Also, the method may include assigning a site authentication by using an administrative console. In addition, the method may include clearing an outbound queue of the server.

In addition, the method may also include downloading requested user information from an outbound queue. Downloading requested user information may include triggering a data transfer tool. Downloading requested user information may also include inserting data into a database at the mobile computer. The method may also involve storing a parameter file that includes user selectable parameters associated with installation of a computer program on the site. The method may also include copying the parameter file onto the mobile computer. The method may further include using the parameter file to automatically interact with an installation application on the mobile computer to install the application onto the mobile computer. The site may include a computer that subscribes to the common data from the server. In addition, the network may include a wireless network. Also, the network may include a local area network.

In another aspect, the invention provides an apparatus that includes a memory that stores executable instructions for installing a software application and associated data on mobile computers. A processor executes the instructions to copy, from a database of a server to a site, data that are to be used in common by mobile computers. The processor also executes instructions to copy the data to each of the mobile computers through a network. The processor further executes instructions to copy additional data to each of the mobile computers. The additional data are different for at least two of the mobile computers. This aspect of the invention may have one or more of the features previously described.

In still another aspect, the invention provides an article that includes a machine-readable medium that stores executable instructions for installing a software application and associated data on mobile computers. The instructions cause a machine to copy, from a database of a server to a site, data that are to be used in common by mobile computers. The instructions also cause a machine to copy the data to each of the mobile computers through a network. The instructions further cause a machine to copy additional data to each of the mobile computers. The additional data are different for at least two of the mobile computers. Again, this aspect of the invention may have one or more of the features previously described.

Various embodiments of the invention have one or more of the following advantages. By splitting the data between common data and mobile computer specific data, a user saves time in installing data onto the mobile computer. Also, the user can install the data onto multiple mobile computers without occupying the resources of a central server because the processing is distributed to a local site server. The process of installing an application is automated, which not only shortens the processing time but there is a reduction in the amount of human errors occurring. Further advantages are discussed below, and also will be apparent from the drawings and the following description.

DESCRIPTION OF THE DRAWINGS

Like reference numbers in different figures indicate like elements.

DESCRIPTION

Figure 1:
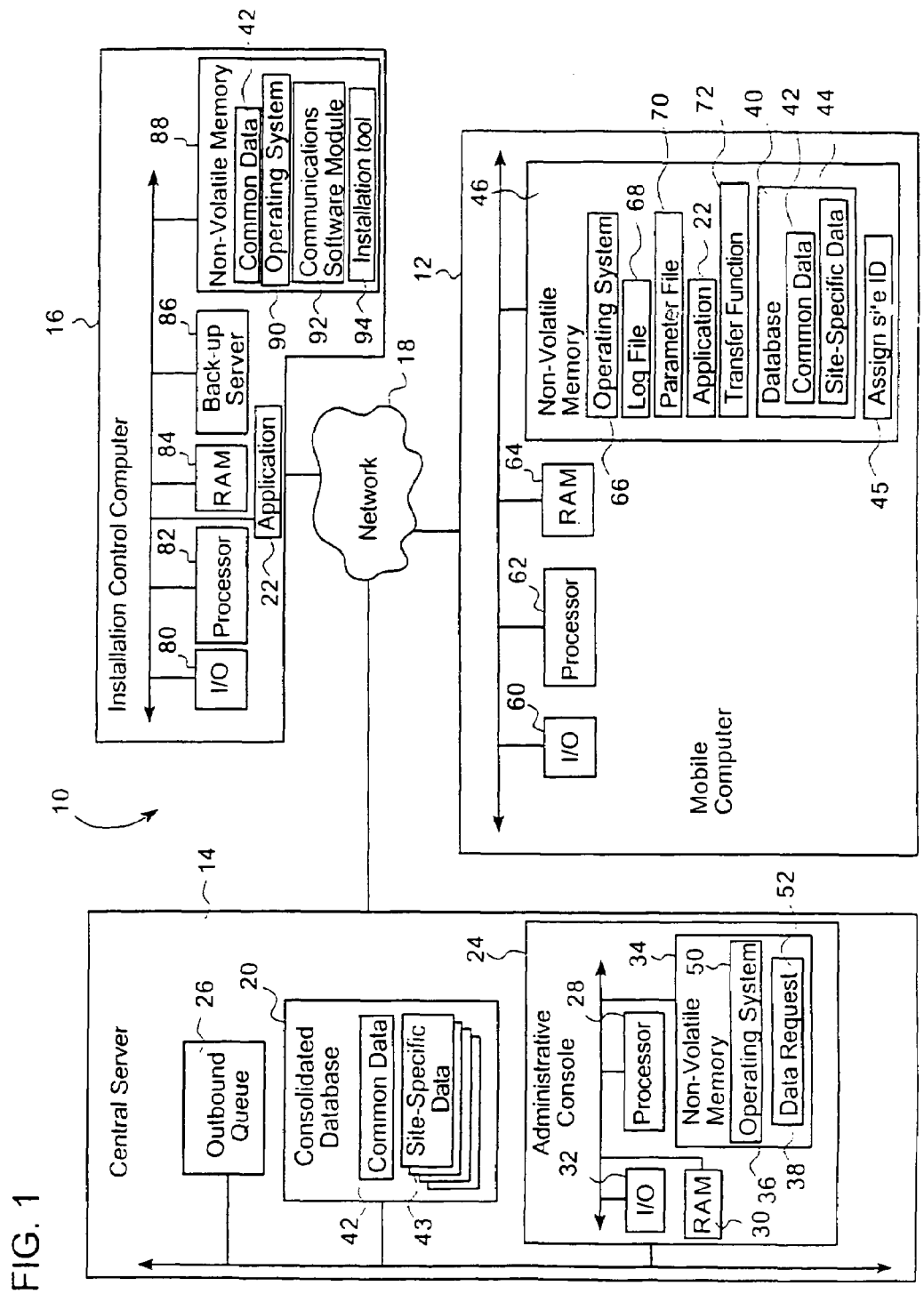
FIG. 1 is a block diagram of a system used for downloading data onto a mobile computer.

A system 10, shown in FIG. 1, enables the installation of a new or upgraded software application and its associated data onto one or more mobile computers, only one such mobile computer 12 being shown in FIG. 1. The system 10 includes a central server 14 that maintains data pertinent to mobile computers in a consolidated database (CDB) 20 and synchronizes the mobile computers with other servers (not shown). A software application 22 to be installed on the mobile computer 12 is stored on an installation control computer 16. Installation control computer 16, connected to the central server 14 and mobile computer 12 by a network 18, is a workstation to download data from the CDB 20 to mobile computer 12 for use with application 22.

In order to install or upgrade the software application and the associated data from CDB 20 onto the mobile computer 12, a network administrator configures system 10 to recognize each mobile computer. A user of mobile computer 12 connects the mobile computer to installation control computer 16 via network 18. For example, the user may dial-up to access the installation control computer 16. The user is prompted with a series of questions, and once answered, application 22 and the associated data are loaded onto mobile computer 12. Other mobile computers may follow the same installation procedure until all the mobile computers have the new or upgraded data.

Typically, a specific mobile computer 12 does not need access to all of the data stored in the CDB 20, but only a portion of the data in the CDB 20 that are relevant to the specific user of the specific mobile computer 12. As such, mobile computer 12 has a database 40 within non-volatile memory 46 that stores common data 42 and site-specific data 44. Thus, the CDB 20 includes common data 42 and a set of site-specific data 43 for all mobile computers (including site-specific data 44 for mobile computer 12). Common data 42 includes data that all mobile computer users typically need to access (that is, data common to all mobile computers). Site-specific data 44 includes data that are specific for a single mobile computer so that site-specific data for one mobile computer may not be the same site-specific data used by an another mobile computer. For example, consider two mobile computers that are each laptops used by a sales person responsible for different sales regions. The common data may include products and sales lists that both sale persons use to sell products common to their business. Common data can also include customizing data (such as customized user interface settings) applicable to all of the mobile computers that will run application 22. The site-specific data may include customer data for one of the sales regions such as the names and contacts of customers within a sales region.

Central server 14 also includes an administrative console 24 and an outbound queue 26. Administrative console 24 is a computer, for example, that has a processor 28, a random access memory (RAM) 30, an input/output device 32, and non-volatile memory 34. Non-volatile memory 34 includes an operating system 50 and a software module for a data request function 52. Processor 28, using the data request function 52, processes the request for data from the CDB 20. Outbound queue 26 is a queue for all data from the CDB 20 being sent via network 18 to installation control computer 12 and mobile computer 12.

Mobile computer 12 also includes an input/output (I/O) device 60, a processor 62, a RAM 64 and an operating system 66 in non-volatile memory 46. Non-volatile memory 46 further includes a log file 68 that records the installation of application 22 onto mobile computer 12, a parameter file that records a user's answers to the application installation questions during installation of application 22, a transfer function software module 72, and assign site ID software component 45. Transfer function module 72 is a tool used to upload and download data between mobile computer 12 and central server 14, and between central server 14 and installation control computer 16. For example, transfer function module 72 can be an executable file. Assign site ID software component 45 is used to remotely assign site identifiers to a mobile client 12.

Installation control computer 16 also includes an I/O 80, a processor 82, a RAM 84, a back-up server 86 used to backup common data 42, and application 22 and non-volatile memory 88. Non-volatile memory 88 includes common data 42, an operating system 90, a communications software module 92, and an installation tool 94. Communications software module 92 facilitates the communication between mobile computer 12 and between central server 14. Installation tool 94 install application 22 onto mobile client 12.

Figure 2:
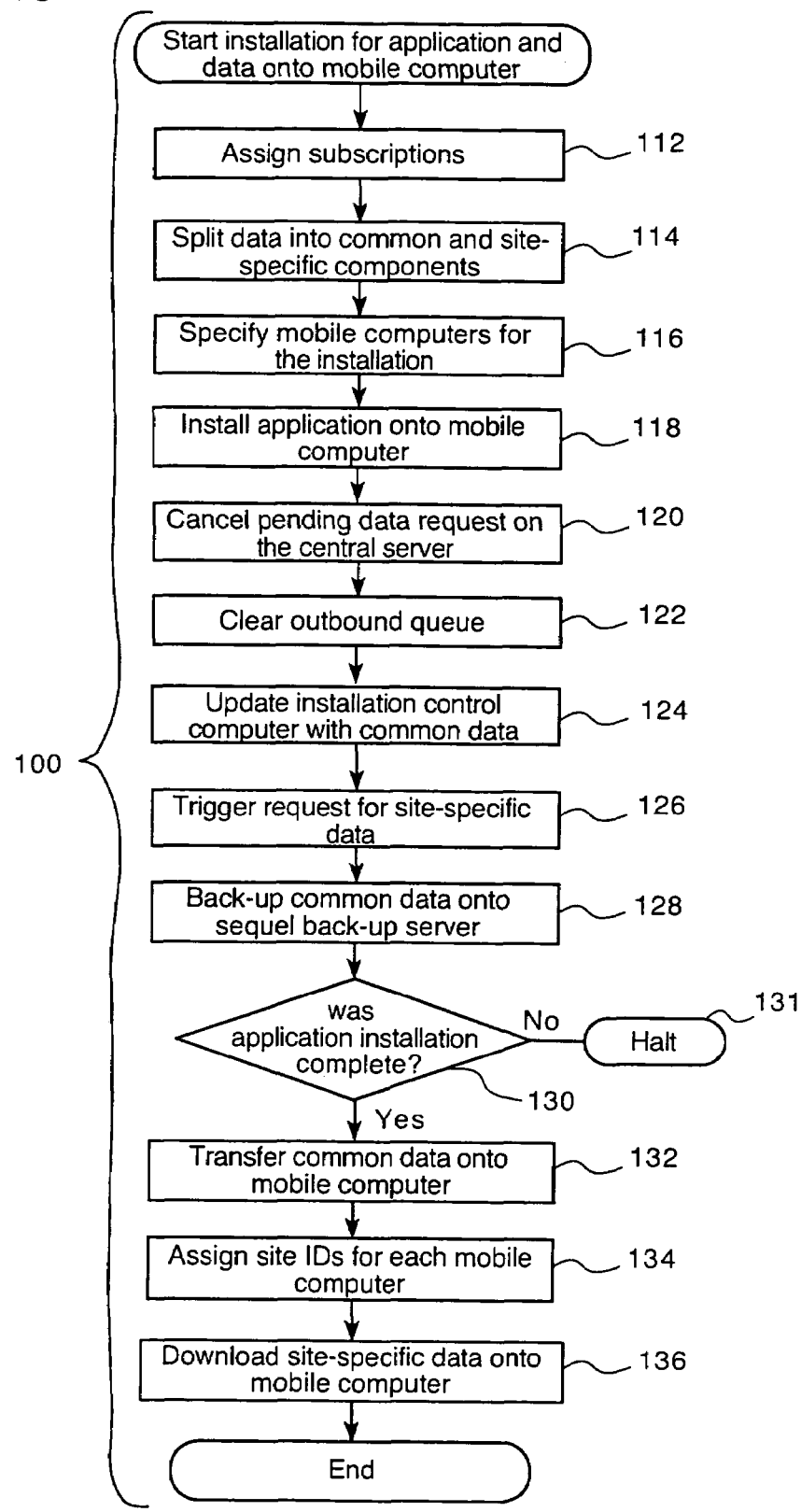
FIG. 2 is a process for downloading data onto the mobile computer.

Referring to FIG. 2, an exemplary process for downloading data onto a mobile computer is a process 100. The network administrator assigns, at 112, using administrative console 24, a common data subscription and a site-specific data subscription for each mobile computer. The common data subscription identifies what data in CDB 20 are common data for a particular mobile computer 12. The site-specific subscription data identifies what data in CDB 20 are site-specific data in CDB 20 applicable to a particular mobile computer 12.

At 114, the network administrator, using administrative console 24, also splits data within CDB 20 into common data 42 and site-specific data 43 according to the subscriptions. Alternatively, installation site computer 16 can determine common data 42 by comparing the common data subscription with the site-specific data subscription. The network administrator, at 116, specifies which mobile computers will receive a planned install, that is, receive application 22, common data 42 and site-specific data 44. The network administrator has several options of choosing these mobile computers. The options include selecting the applicable mobile computers from a list in a user interface displayed on administrative console 24. Other options include selecting applicable mobile computers by using a search mechanism that identifies the available mobile computers. Another option includes listing applicable mobile computers in a text file that is read by the central server 14.

The network administrator has no further actions during process 100. The remaining actions in process 100 are automatically performed except for user requested information described below.

Figure 3:
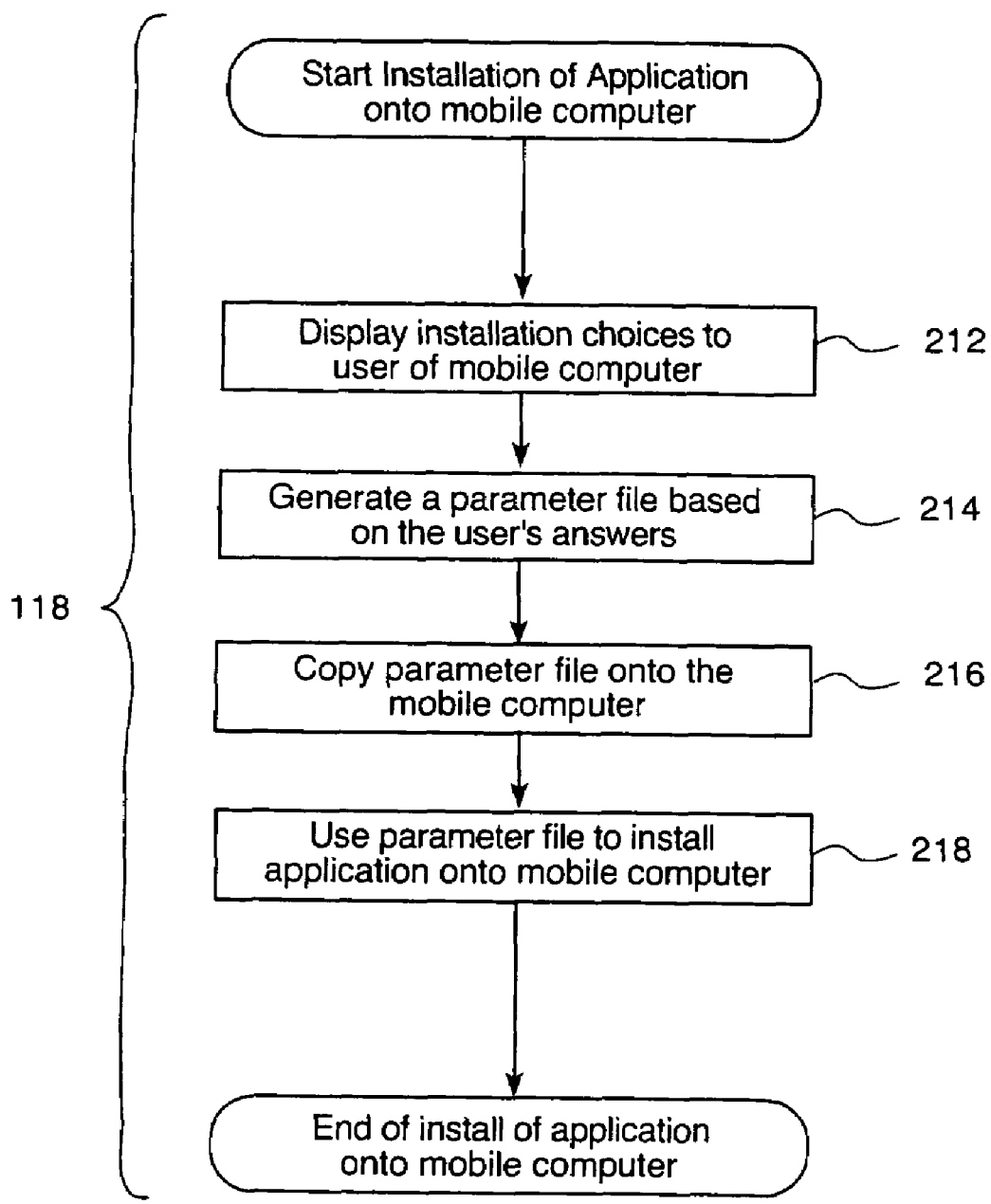
FIG. 3 is a process for automatically installing an application on to the mobile computer.

At step 118, installation control computer 16 installs application 22 onto mobile computer 12 using installation tool 94. The details of this installation step 118 are shown in FIG. 3. As shown there, the central server 14, at 212, displays to the user of a mobile computer 12 a series of requests for data. These requests can be displayed in a user interface, or the user may be prompted for the inputs through a command prompt. The requests include, for example, username, password, domain name, location where the application is to be installed, machine name, etc. The user also has the option of not choosing an automatic installation, and instead installing the application manually. Then at 214, installation control computer 16 generates parameter file 70 after recording the user's selections. At 216, installation control computer 16 copies parameter file 70 onto mobile computer 12. When the installation continues, installation control computer 16, at 218, uses parameter file 70 to automatically install the application onto mobile computer 12. For example, the application will be installed in the location specified by the user. When the installation of the application is complete, mobile computer 12 generates log file 68 recording the installation process and indicating whether the installation was completed. Log file 68 is not generated if the user chooses a manual installation.

Referring back to FIG. 2 at step 120, installation control computer 16 cancels any requests to central server 14 for data that may be already pending, and that were manually triggered by users of mobile computers 12. Installation control computer 16 communicates to administrative console 24, which in turn cancels the manual requests. At 122, installation control computer 16 clears outbound queue 26 of any data posted that may have been initiated by the manual user requests. At 124, installation control computer 16, using communications component 92, remotely activates data transfer function module 72 to update installation control computer 16 with current common data 42 from CDB 20. After data transfer function module 72 initiates the request for common data 42 from central server 14, administrative console 24, processing instructions from data request component 52, enables the copying of common data 42 from the central server 14 to the installation control computer 16. In other embodiments, this data transfer function module 72 is scheduled to periodically update installation control computer 16 with common data 42.

At step 126, installation control computer 16 sends instructions to administrative console 24. The administrative console 24 takes actions in response, as dictated by data request component 52, to trigger a request for site-specific data 44 to be downloaded to mobile computer 12. Site-specific data 44 are extracted from CDB 20 and the data are posted in outbound queue 26.

Installation control computer 16, at 128, backs-up common data 42 in non-volatile memory 88 to back-up server 86. Installation control computer 16 determines at 130 whether the application installation was completed. Before preceding further, a check is made on mobile computer 12 to determine whether application 22 is already installed by checking to see if log file 68 exists on the mobile computer 12. If there is no log file 68 on a particular mobile computer, then further processing may be halted at 131 for that mobile computer.

Mobile computer 12, at 132, using file transfer function module 72, transfers common data from installation control computer 16 onto mobile computer 12. Installation control computer 16 assigns, at 134, site identifiers (IDs) for each mobile computer by using communications component 92. Communications component 92 remotely assigns the site IDs by executing the assign site ID software component 45 on mobile client 12. With site IDs identified, installation control computer 16 downloads, at 136, site-specific data 44 from server 14 to mobile computer 12 by initiating transfer function module 72 on mobile computer 12 remotely from communications component 92.

Storing the common data 42 at the installation control computer 16 increases the overall performance in loading data onto each mobile computer 12 because common data 42 need not be downloaded every time from central server 14. Downloading common data 42 from central server 14 may be time consuming, for example, because outbound queue 26 is loaded with the same data for each mobile computer. In addition, the data transferred from the central server 14 may need to be formatted each time the data are sent to a client computer. By forwarding the common data to the installation control computer 16 and downloading the formatted data from there to the mobile clients, this sometimes time-consuming formatting may need only be done once. Similarly, performance time may be improved because the download time for common data 42 from central server 14 to mobile computer 12 is greater than the time taken for a file transfer operation from installation control computer 16 to the mobile computer. Also, the central server 14 is typically processing other instructions from other servers and computers that are unrelated to the installation process, which may cause a delay in data transfers from that server. On the other hand, the installation control computer 16, at least during the time that an installation job is being performed, typically will not be performing other functions unrelated to the install process, and so delays in data transfers from the installation control computer 16 to the mobile computers will be minimized. Accordingly, using process 100, each mobile computer 12 receives all the data (common data 42 and site-specific data 44) necessary for an installation (or an upgrade) more efficiently.

Processes 100 and 118 are not limited to the specific embodiments described herein. For example, application 22 can be stored anywhere in system 10 such as central server 14 and subsequently downloaded to mobile computer 12. Application 22 can also reside on a peripheral drive (not shown) of mobile computer 12 or a computer not within system 10. Network 18 can include one or more of a local area network, a wireless area network, and a public switched telephone network (PSTN). Processes 100 and 118 are not limited to the specific processing order of FIGS. 2 and 3. Rather, the blocks of FIGS. 2 and 3 may be re-ordered, as necessary, to achieve the results set forth above.

What is claimed is:

1. A method of installing data stored in an on-line accessible database onto mobile computers, comprising:

copying, from the on-line accessible database and to an installation control computer, common data that have been identified for installation onto each of the mobile computers to enable access to the common data when the on-line accessible database is not accessible by the mobile computer;

copying the copied common data from the installation control computer to each of the mobile computers through a network; and copying additional data from the on-line accessible database to each of the mobile computers without intermediately copying the additional data to the installation control computer, wherein the additional data a) are different for at least two of the mobile computers, and b) have been identified for installation onto the mobile computers to enable access to the additional data when the on-line accessible database is not accessible by the mobile computer.

2. The method of claim 1, wherein the installation control computer comprises a computer that subscribes to the common data from the server.

3. The method of claim 1, further comprising:
installing automatically the software application program onto the mobile computer.

4. The method of claim 3, further comprising:
storing a parameter file that includes user selectable parameters associated with installation of the software application program on the installation control computer;
copying the parameter file onto the mobile computers; and
using the parameter file to automatically interact with an installation application on the mobile computer to install the software application program onto the mobile computer.

5. The method of claim 1, further comprising:
checking and canceling pending requests for information in the server.

6. The method of claim 1, further comprising:
clearing an outbound queue of the server.

7. The method of claim 1, further comprising:
updating the installation control computer periodically with the common data from the server.

8. The method of claim 1, further comprising:
assigning a site authentication by using an administrative console.

9. The method of claim 1, further comprising:
downloading requested user information from an outbound queue.

10. The method of claim 9, wherein downloading requested user information comprises triggering a data transfer tool.

11. The method of claim 9, wherein downloading requested user information comprises inserting data into a database at the mobile computer.

12. The method of claim 1, wherein the network comprises a wireless network or a local area network.

13. The method of claim 1, further comprising:
storing a parameter file that includes user selectable parameters associated with installation of a software application program on the installation control computer;
copying the parameter file onto the mobile computer; and
using the parameter file to automatically interact with an installation application on the mobile computer to install the software application program onto the mobile computer.

14. The method of claim 1, wherein:
the mobile computers on which the common data are copied are configured for use by salespersons; and
the common data comprises products and sales lists that all salespersons for a business use to sell products.

15. The method of claim 14, wherein:
the additional data comprises customer data for one of multiple sales regions.

16. An apparatus comprising:
a memory that stores executable instructions for installing data stored in an on-line accessible database onto mobile computers; and
a processor that executes the instructions to:
copy, from the on-line accessible database and to an installation control computer, common data that have been identified for installation onto each of the mobile computers to enable access to the common data when the on-line accessible database is not accessible by the mobile computer;
copy the copied common data from the installation control computer to each of the mobile computers through a network; and
copy additional data from the on-line accessible database to each of the mobile computers without intermediately copying the additional data to the installation control computer, wherein the additional data a) are different for at least two of the mobile computers, and b) have been identified for installation onto the mobile computers to enable access to the additional data when the on-line accessible database is not accessible by the mobile computer.

17. The apparatus of claim 16, wherein the installation control computer comprises a computer that subscribes to the common data from the server.

18. The apparatus of claim 16, further comprising instructions to:
install automatically a software application program onto the mobile computer.

19. The apparatus of claim 18, further comprising instructions to:
store a parameter file that includes user selectable parameters associated with installation of software application program on the installation control computer;
copy the parameter file onto the mobile computers; and
use the parameter file to automatically interact with an installation application on the mobile computer to install the software application program onto the mobile computer.

20. The apparatus of claim 16, further comprising instructions to:
check and cancel pending requests for information in the server.

21. The apparatus of claim 16, further comprising instructions to:
clear an outbound queue of the server.

22. The apparatus of claim 16, further comprising instructions to:
update the installation control computer periodically with the common data from the server.

23. The apparatus of claim 16, further comprising instructions to:
assign a site authentication by using an administrative console.

24. The apparatus of claim 16, further comprising instructions to:
download requested user information from an outbound queue.

25. The apparatus of claim 24, wherein to download requested user information comprises triggering a data transfer tool.

26. The apparatus of claim 24, wherein to download requested user information comprises inserting data into a database at the mobile computer.

27. The apparatus of claim 16, wherein the network comprises a wireless network or a local area network.

28. The apparatus of claim 16, further comprising instructions to:
store a parameter file that includes user selectable parameters associated with installation of a software application program on the installation control computer;
copy the parameter file onto the mobile computer; and
use the parameter file to automatically interact with an installation application on the mobile computer to install the software application program onto the mobile computer.

29. The apparatus of claim 16, wherein:
the mobile computers on which the common data are copied are configured for use by salespersons; and
the common data comprises products and sales lists that all salespersons for a business use to sell products.

30. The apparatus of claim 29, wherein:
the additional data comprises customer data for one of multiple sales regions.

31. An article comprising a machine-readable medium that stores executable instructions for installing data stored in an on-line accessible database onto mobile computers, the instructions causing a machine to:
copy, from the on-line accessible database and to an installation control computer, common data that have been identified for installation onto each of the mobile computers to enable access to the common data when the on-line accessible database is not accessible by the mobile computer;
copy the copied common data from the installation control computer to each of the mobile computers through a network; and
copy additional data from the on-line accessible database to each of the mobile computers without intermediately copying the additional data to the installation control computer, wherein the additional data a) different for at least two of the mobile computers, and b) have been identified for installation onto the mobile computers to enable access to the additional data when the on-line accessible database is not accessible by the mobile computer.

32. The article of claim 31, wherein the installation control computer comprises a computer that subscribes to the common data from the server.

33. The article of claim 31, further comprising instructions causing the machine to:
install automatically software application program onto the mobile computer.

34. The article of claim 33, further comprising instructions causing the machine to:
store a parameter file that includes user selectable parameters associated with installation of a software application program on the installation control computer;
copy the parameter file onto the mobile computers; and
use the parameter file to automatically interact with an installation application on the mobile computer to install the software application program onto the mobile computer.

35. The article of claim 31, further comprising instructions causing the machine to:
check and cancel pending requests for information in the server.

36. The article of claim 31, further comprising instructions causing the machine to:
clear an outbound queue of the server.

37. The article of claim 31, further comprising instructions causing the machine to:
update the installation control computer periodically with the common data from the server.

38. The article of claim 31, further comprising instructions causing the machine to:
assign a site authentication by using an administrative console.

39. The article of claim 31, further comprising instructions causing the machine to:
download requested user information from an outbound queue.

40. The article of claim 39, wherein to download requested user information comprises triggering a data transfer tool.

41. The article of claim 39, wherein to download requested user information comprises inserting data into a database at the mobile computer.

42. The article of claim 31, wherein the network comprises a wireless network or a local area network.

43. The article of claim 31, further comprising instructions causing the machine to:
store a parameter file that includes user selectable parameters associated with installation of a software application program on the installation control computer;
copy the parameter file onto the mobile computer; and
use the parameter file to automatically interact with an installation application on the mobile computer to install the software application program onto the mobile computer.

44. The article of claim 31, wherein:
the mobile computers on which the common data are copied are configured for use by salespersons; and
the common data comprises products and sales lists that all salespersons for a business use to sell products.

45. The article of claim 44, wherein:
the additional data comprises customer data for one of multiple sales regions.

* * * * *